INVENTOR
JOHN DESMOND PARSONS

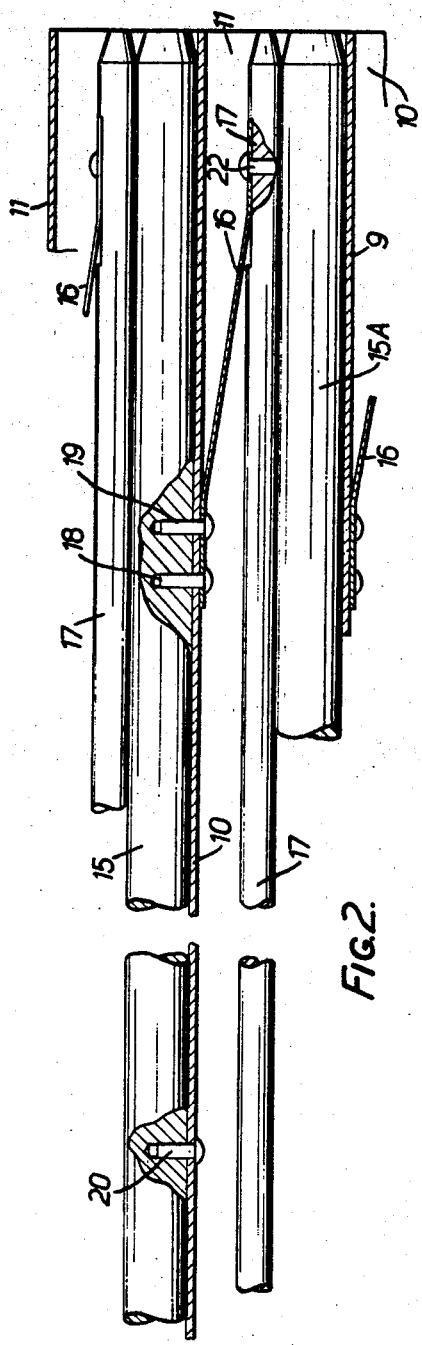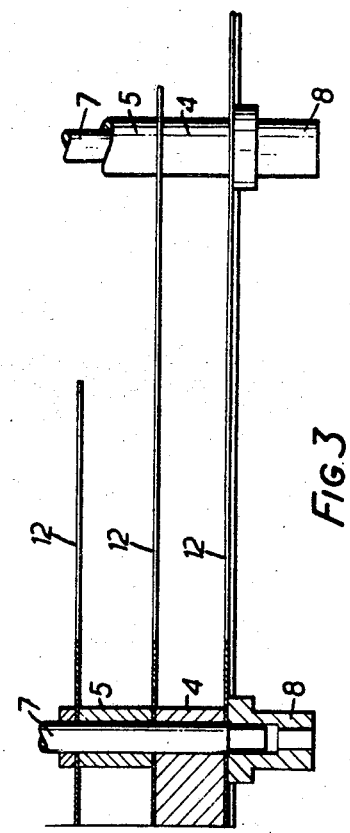

United States Patent Office 3,494,477
Patented Feb. 10, 1970

3,494,477
MECHANICAL STORAGE AND HANDLING DEVICES FOR PART-ANNULAR ARTICLES
John Desmond Parsons, Troon, Scotland, assignor to G. B. Tools and Components Exports Limited, Alperton, Wembley, Middlesex, England
Filed Feb. 23, 1968, Ser. No. 707,710
Claims priority, application Great Britain, Mar. 9, 1967, 11,170/67
Int. Cl. A47f 7/00
U.S. Cl. 211—49                 11 Claims

ABSTRACT OF THE DISCLOSURE

A rack for supporting semi-cylindrical shell bearings is provided with a number of elongated channel members arranged in vertical superposed spaced relation. The channel members have an inverted truncated V configuration in cross-section and are provided with sets of cylindrical gripping rods between them for holding the shells between the rods and with their edges against the inclined outer sides of the channels.

---

This invention relates to storage or handling devices for part-cylindrical articles of part annular form such as thin-walled part-cylindrical bearing shells, and has for its object to provide a storage or handling unit, more especially suitable for use during manufacture of such articles, in which such articles can be assembled quickly and in a controlled and orderly fashion, for example for transfer from one manufacturing operation to another in a travelling storage container or for immersion in bulk in a plating bath.

For convenience the term "part-cylindrical" and "semi-cylindrical" will be used herein in the limited sense of meaning part annular rather than constituting part of a solid cylinder. Moreover the invention is applicable to units for storing or handling part-cylindrical articles of part-circular, part polygonal or other part-cylindrical cross-section, but for convenience it will be assumed that the articles are in the form of parts of a right circular cylinder and references to the "subtended angle" are to be understood to refer to the angle subtended at the axis of the cylinder by the arc around which the article extends between its two axially extending edges, i.e. the edges which lie at the ends of the arc and parallel to said axis.

A support or storage unit according to the invention for a series of part-cylindrical articles comprises at least one pair of channel members of V or truncated V cross-section disposed in parallel spaced relationship, with the outer face of one facing the inner face of the other so that the inclined sides of the channel member providing said outer face can provide surfaces for engagement by the axially extending edges of a series of part-cylindrical articles a part or parts of the outer circumferential surfaces of which are engaged by a part or parts of the inner face of the other channel member or by a member or members supported therefrom.

The terms "outer face" and "inner face" herein used with reference to the channel members are used to refer respectively to the surfaces of a channel member which lie on the inside of the V or truncated V and thus face generally towards one another, and the faces which lie on the outside of the V or truncated V and thus face generally away from one another.

Usually the channel members will be of truncated V cross-section, and for convenience will hereinafter be so referred to, the part of each channel member which unites the two sides of the V or truncated V being referred to for convenience as the truncated part.

Preferably the channel member having the said inner face has resiliently connected to it and lying in spaced relationship to said inner face a longitudinally extending member (hereinafter referred to as a gripping part) constituting the part which in use engages parts of the outer circumferential surfaces of the part-cylindrical articles, while in addition the truncated part of the channel member having said outer face may have secured to it a longitudinally extending member (hereinafter called a supporting part) on which bears the part of the inner surface of each part-cylindrical member immediately opposite the gripping part. Thus, the longitudinally extending edges of each part-cylindrical member engage the outer surface of the inclined sides of the appropriate channel member, while the centre of the circumferential length of each part-cylindrical member is lightly gripped between the supporting part and the gripping part.

In order that the support or storage unit may accommodate satisfactorily part-cylindrical members of part-circular cross-section but of different radius of curvature but the same subtended angle at the cylindrical axis, e.g. semi-cylindrical bearing members of different radius of curvature, the angle between the two inclined sides of each channel member is preferably such that, whatever the radius of curvature of a part-cylindrical member having a given subtended angle placed with its axially extending edges in engagement with the outer surfaces of the inclined sides of the appropriate channel member, the centre point in its circumferential length will lie at approximately the same distance from the truncated portion of the channel member. Thus, in the case of a support or storage unit intended for semi-cylindrical articles of semi-circular cross-section the two sides of each channel member would be inclined to one another at an angle of 90°. The support or storage unit will therefore be capable not only of supporting or storing satisfactorily a series of identical part-cylindrical articles but of storing or supporting satisfactorily at the same time part-cylindrical articles whose radii of curvature differ from one another but whose subtended angle is the same.

While in a simple arrangement a support or storage unit according to the invention might consist simply of two channel section members constructed and arranged as described, it will generally be convenient to provide a series of superimposed similar channel section members each of which except the lowermost and the uppermost performs the function of the upper channel member of a pair comprising itself and the channel member immediately below it and the lower channel member of a pair comprising itself and the channel member immediately above it, the uppermost and lowermost channel members therefore performing only respectively the appropriate single functions. Thus, each of the channel members except the lowermost may have secured to the inner surface of its truncated part a gripping member and to the upper surface of its truncated part a supporting part as above described. Moreover each channel member may constitute part of a multi-channel element comprising two or more interconnected channel members disposed side by side and spaced apart by an interconnecting portion so that the element is of generally corrugated form in which each corrugation constitutes a channel member. The superimposed multi-channel elements may then be supported in spaced relationship, for example by supporting posts or like supports extending through the parts of each element which connect the adjacent corrugations constituting the channel members.

A construction according to the invention is shown by way of example somewhat diagrammatically in the accompanying drawings, in which FIGURE 1 is a cross-section through one form of support or storage unit according to the invention in a vertical plane at right angles to the longitudinal axes of the channel members.

FIGURE 2 is a cross-section on the line B—B of FIGURE 1, to an increased scale;

FIGURE 3 is a part-section on the line C—C of FIGURE 1, and

Figure 1:
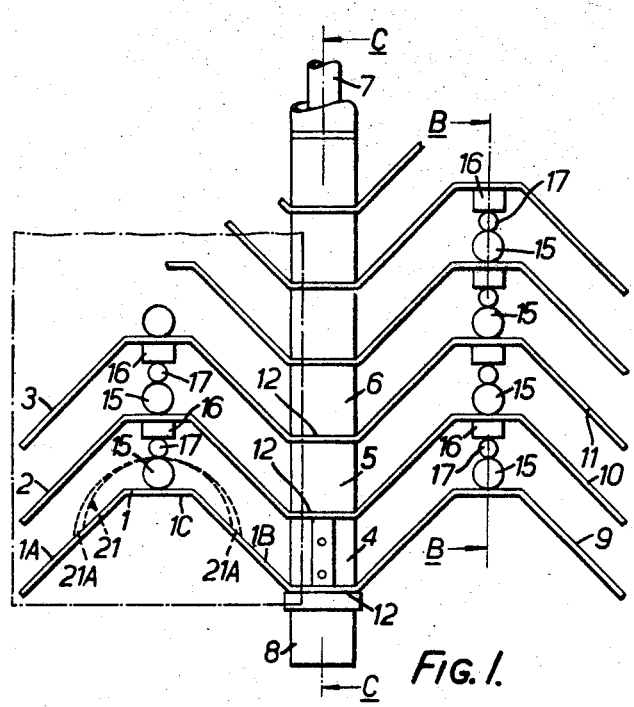

In the construction shown in FIGURES 1, 2 and 3 the unit comprises a plurality of inverted V-section channel members comprising a first series of superimposed and vertically spaced channel members 1, 2, 3, etc. which are respectively formed integral with a laterally-displaced second series of similar superimposed and vertically spaced channel members 9, 10, 11, each of the channel members in the first series being connected by a part 12 to the adjacent channel member of the second series so as to form a unit therewith. The units thus formed are supported in the required superimposed relationship, as shown, on three vertical rods 7 horizontally spaced from one another and passing through the parts 12 with the interposition of spacers 4, 5, 6 etc., the lowermost unit 1, 9 being prevented from sliding downwards on the rods 7 by a limiting stop 8 having a collar and secured to each rod 7.

As will be seen, each of the channel members 1, 2, 3, 9, 10, 11 is of inverted truncated V-cross-section including inclined sides, identified as 1A and 1B for the channel member 1, interconnected by a horizontal piece, identified as 1C for the channel member 1. Connected by screws 18, 19, 20, to the upper face of the horizontal piece of each channel member except the uppermost in any series is a supporting part 15 in the form of a longitudinally extending rod, for example of a suitable plastics material such as nylon, while there is supported on leaf springs 16 (FIGURE 2) carried by the screws 18, 19, from the lower face of the horizontal piece of each channel member (except the lowermost in any series) a gripping part 17 also in the form of a longitudinally extending rod, e.g. of plastics material such as nylon. Each spring 16 is screwed to the rod 17 as at 22. Thus, semi-cylindrical articles as indicated in dotted lines at 21 in FIGURE 1 can be disposed in a horizontal series between each pair of adjacent vertically displaced channel members so that their axially extending edges 21A lie in engagement with the upper faces of the inclined sides of the lower of the two channel members e.g. the sides 1A, 1B, while they are lightly gripped along an axially extending line at the centre of their circumferential length between the gripping part 17 and the supporting part 15.

Figure 4:
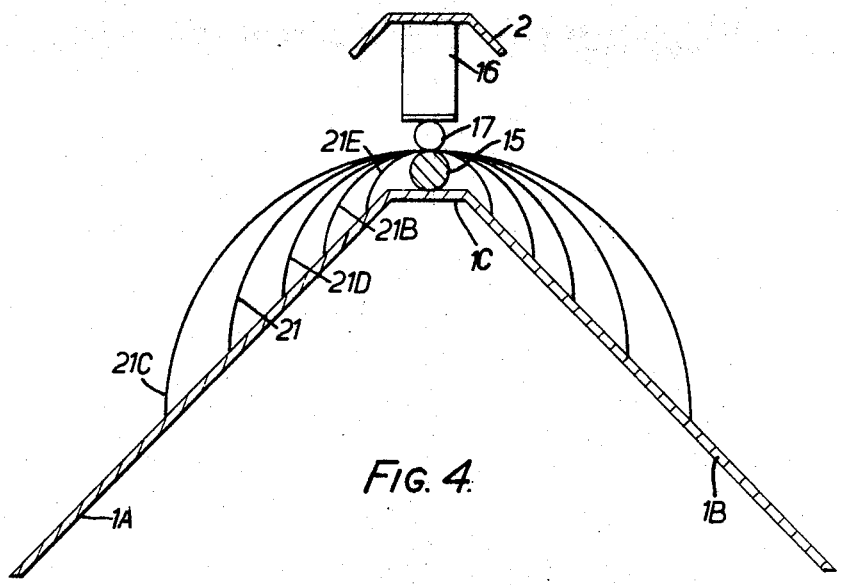
FIGURES 4, 5 and 6 are diagrams illustrating respectively features of the support of FIGURE 1 and of two modifications.

In the construction shown, which is intended particularly to support semi-cylindrical articles, the two inclined sides of each channel member i.e. 1A and 1B, lie in planes at right angles to one another, and it will be seen that with this arrangement, within the range of "sizes" which the supporting unit can accommodate, not only can batches of semi-cylindrical articles of different radii of curvature be accommodated in the manner indicated, but semi-cylindrical articles of different radii of curvature can be accommodated at one time between any pair of superimposed adjacent channel members as indicated diagrammatically in FIGURE 4, in which each of the semi-circular lines 21, 21B, 21C etc. represents a semi-cylindrical member of a different radius of curvature. It will be understood that the applicability of the feature diagrammatically shown in FIGURE 4 depends on the thickness of the semi-cylindrical articles accommodated not being so widely different as to prevent the proper functioning of the gripping part 17.

Figure 5:
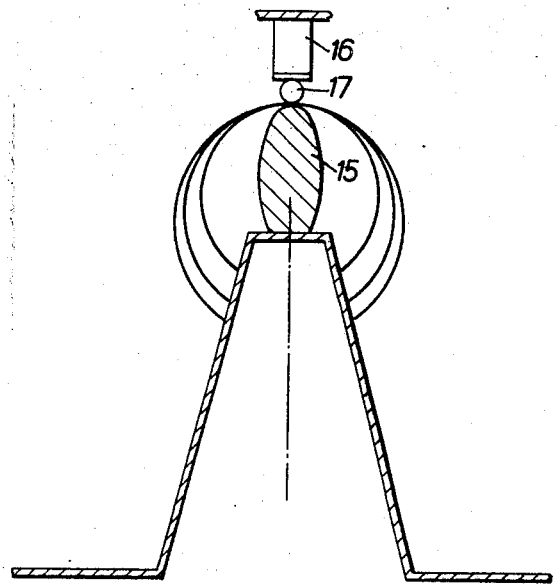
Figure 6:
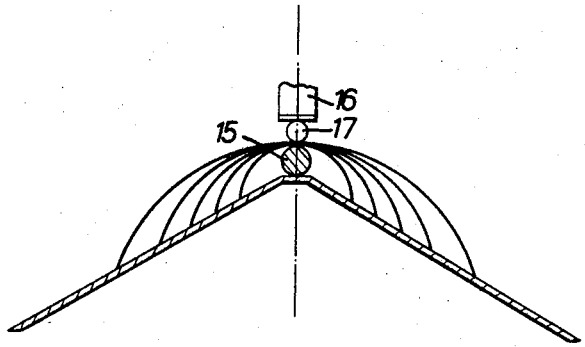

FIGURES 5 and 6 are similar diagrams to FIGURE 4 showing in exaggerated manner that by appropriate selection of the angle between the sides of the channel members in units according to the invention, part-cylindrical articles other than of semi-cylindrical form and all of the same subtended angle but with different radii of curvature can be accommodated in a similar manner to that shown in FIGURE 4.

It will be appreciated that by varying the dimensions of the spacers 4, 5, 6, and /or of the channel members, and/or of the supporting parts 15, gripping parts and/or associated parts, the unit can be made suitable for supporting or storing various ranges of sizes of part-cylindrical article and/or various numbers of these articles. Further, it will be seen that each part-cylindrical article is located correctly in the circumferential direction by the engagement of its axially extending edges with the outer surface of the inclined sides of the lower of the two channel members between which it lies.

In use the part-cylindrical articles can be loaded from one end into the space between a pair of superimposed channel members so as to form in effect a continuous "tunnel" of semi-cylindrical articles, whether all of the same radius and length or not, the various spaces between the different pairs of superimposed channel members being filled, for example, in succession, possibly by automatic means associated with a machine.

A typical storage unit according to the invention might comprise, for example, 25 multiple-channel channel members arranged one above the other and each comprising, for example, 8 laterally displaced channels each of about 20 inches in width. The storage unit will preferably have door members to close the open ends of the spaces between the channel members, and arranged to be readily opened by hand or opened automatically, for example by sliding them sideways or vertically. In addition, the storage unit may be provided with wheels, castors or other means to facilitate its travel on a floor or rails, and may have associated with it lifting and lowering gears and/or loading and unloading gear capable, for example, of moving from channel to channel or from one row of channels to another so as to load or unload the channels or rows of channels successively.

What I claim as my invention and desire to secure by Letters Patent is:

1. A support unit for part-cylindrical articles comprising a pair of channel members of V cross-section disposed in parallel spaced relationship with the outer face of one facing the inner face of the other, the inclined sides of the channel member constituting said outer face providing surfaces for engagement by the axially extending edges of a series of part-cylindrical articles, and a gripping part carried by the inner face of the other channel member resiliently engaging a part of the outer circumferential surfaces of the articles.

2. A unit as claimed in claim 1 in which a longitudinally extending gripping part is resiliently connected to, and lies in spaced relationship to, the inner face of the channel member.

3. A unit as claimed in claim 1 including a series of superimposed similar channel section members each of which except the lowermost and the uppermost performs the function of the upper channel member of a pair comprising itself and the channel member immediately below it and the lower channel member of a pair comprising itself and the channel member immediately above it.

4. A unit as claimed in claim 3 in which each of the channel members except the lowermost has secured to the inner surface of its truncated part a gripping member and to the upper surface of its truncated part a supporting part.

5. A unit as claimed in claim 1 in which each channel member constitutes part of a multi-channel element comprising two or more interconnected channel members disposed side by side and spaced apart by an interconnecting portion, the element being of generally corrugated form in which each corrugation constitutes a channel member.

6. A unit as claimed in claim 5 in which the superimposed multi-channel elements are supported in spaced relationship by supporting posts extending through parts of each element laterally spaced from the channel members.

7. A support unit for part-cylindrical articles comprising a channel member of inverted V cross-section with the outer faces of the inclined sides constituting surfaces for engagement by the axially-extending edges of a series of part-cylindrical articles, the V section being truncated at the apex, a rod positioned against the truncated part, and a gripping part, and springs urging the gripping part towards the rod for gripping articles resiliently between the gripping part and the rod.

8. A support unit as claimed in claim 11 in which said rod is of circular cross-section.

9. A support unit as defined in claim 11 wherein said gripping part is constituted by a rod having a circular cross-section and said rod which is positioned against said truncated part of said channel member also has a circular cross-section.

10. A unit as claimed in claim 7 in which the sides of the channel member are inclined to one another at an angle of 90°.

11. A unit as claimed in claim 7 in use supporting part-cylindrical articles which are not all of the same radius.

References Cited

UNITED STATES PATENTS

| | | | |
|---|---|---|---|
| 1,922,122 | 8/1933 | Carew | 211—49 |
| 2,344,804 | 3/1944 | Crosby | 211—49 |
| 3,202,291 | 8/1965 | Root | 211—49 |

JAMES A. LEPPINK, Primary Examiner